Dec. 25, 1951  J. T. GIER ET AL  2,580,293
THERMOPILE RADIOMETER
Filed March 20, 1948
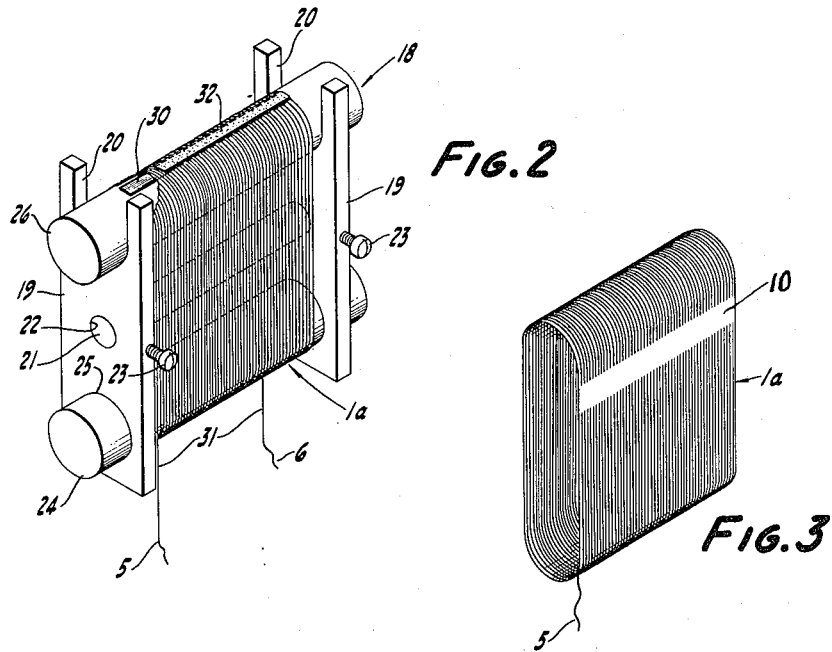
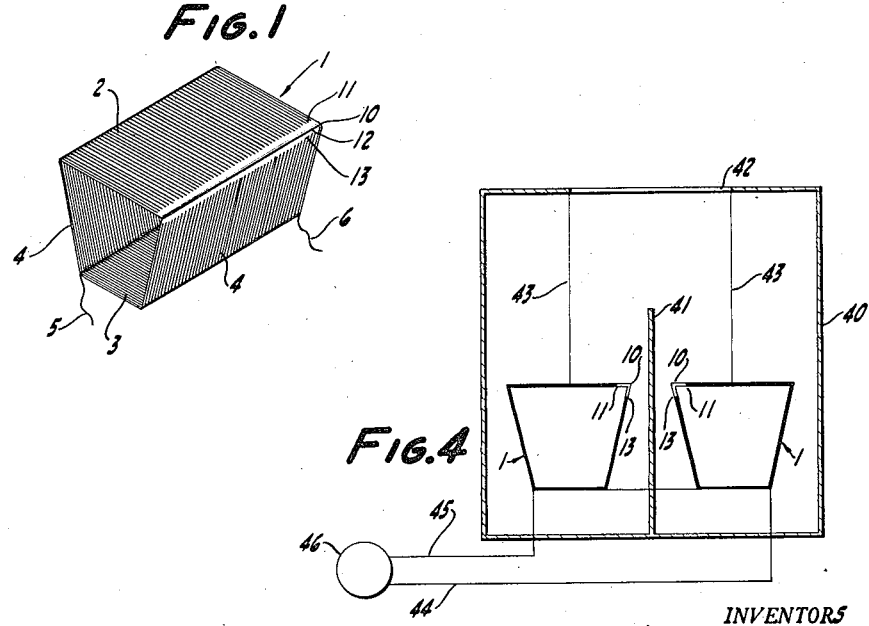
INVENTORS
JOSEPH T. GIER
LLEWELLYN M. K. BOELTER
EVERETT R. DEMPSTER
ROBERT BROMBERG
BY Mellin and Hanscom
ATTORNEYS Patented Dec. 25, 1951

2,580,293

UNITED STATES PATENT OFFICE 2,580,293

THERMOPILE RADIOMETER

Joseph T. Gier, Oakland, Llewellyn M. K. Boelter and Robert Bromberg, Los Angeles, and Everett R. Dempster, Orinda, Calif., assignors to The Regents of the University of California, Berkeley, Calif.

Application March 20, 1948, Serial No. 16,024

6 Claims. (Cl. 136—4)

This invention relates to a thermopile radiometer, and more particularly to a thermopile radiometer of the type comprising a coil of homogeneous metal in which the thermocouple junctions are obtained by plating a portion of the coil with a dissimilar metal.

The most highly sensitive thermopiles heretofore in use have been of the vacuum type. That is to say, the receiver is placed in an evacuated chamber to reduce as much as possible temperature differentials owing to fluctuations in the temperature of the air surrounding the instrument. Vacuum type thermopiles are disadvantageous because they necessitate the use of a window of glass or other transparent material, which has an adverse selective filtering action on the radiation which is measured by the instrument.

The more sensitive types of thermopiles heretofore in use, whether of the vacuum type or whether used in air, have also been disadvantageous in that they are expensive and require highly skilled labor to construct them.

It is an object of the present invention to provide a novel form of thermopile which is characterized by high sensitivity, yet is operable in air and can be constructed by semi-skilled labor.

It is a further object of the invention to provide a thermopile radiometer which is of simple construction yet is highly sensitive and can be used in air without material loss of sensitivity.

It is a still further object of the invention to provide a thermopile radiometer which can be enclosed in a small tubular container.

It is a further and particular object of the invention to provide a means of producing a self-sustaining coil adapted to be used as the receiver of a thermopile radiometer.

These and other objects of the invention will be apparent from the following description and the appended claims.

The invention will be better understood by reference to the accompanying drawings, in which:

Fig. 1 is a perspective view of the preferred form of self-sustaining coil of the invention.

Fig. 2 is a perspective view of a demountable spool or support used in making the coil of the invention, showing the coil in position on the support.

Fig. 3 is a perspective view of the coil after it has been removed from the support and before it has been shaped into the form shown in Fig. 1.

Fig. 4 is a cross-sectional view of the assembled instrument showing the housing, the positioning and manner of suspending the coils therein and the electrical circuit in which the coils are included.

Referring now to the figures of the drawings, and more particularly to Fig. 1, the coil 1 is in the form of an isoceles trapezoid having a top portion 2, a base 3 and inwardly and downwardly slanting side portions 4. The numerals 5 and 6 indicate the leads. A strip 10 extending from a line 11 lying on the top portion 2 of the coil and parallel to the edge 12 thereof, to a line 13 lying on the adjacent side portion 4 and also parallel to the edge 12, constitutes a series of thermocouple junctions, the hot junctions being at 11 and the cold junctions at 13.

In producing the coil 1, the following procedure is preferably employed: Referring to Fig. 2 of the drawings, there is provided a demountable support 18, preferably made of a lacquered metal, such as steel, and comprising two identical spaced end pieces 19, each having a U-shaped slot 20 at its upper end. The end pieces 19 are joined at their centers by a tie rod 21 received within complemental bores 22, and secured in place by set screws 23. A lower rod 24, provided with a vitreous enamel surface and of larger diameter than the tie rod 21, extends through and forms a sliding fit within complemental bores 25 near the lower ends of the end pieces 19. A similar upper rod 26 having a vitreous enamel surface is seated in the U-slots 20 at the top of the end pieces 19.

With the support thus mounted, a strip of metal foil 30, such as silver or aluminum foil, is lightly cemented to the rod 26, as shown, to short circuit the turns of the coil during the electroplating operation described hereinafter. Then a suitable length of conductor wire 31 is wound around the upper and lower rods 26 and 24 to form a more or less elliptical coil 1a. Various types and gauges of wire may be used, but we have found constantan wire of No. 40 B and S gauge to be the most suitable. The turns of conductor wire are closely spaced but are slightly out of contact with one another.

A strip of tissue paper 32 is then cemented to the face of the coil 1a. The paper strip 32 is of the same width as the desired width of the strip 10, and it is so placed as to overlie the rod 26 and to cover the metal foil 30. The whole assembly is washed in a hot aqueous potassium cyanide solution and is then immersed in a standard silver chloride-potassium cyanide electro-silver plating solution. The thickness of plating is controlled by fixing the current and time. The paper strip 32 serves to blank off the underlying segment of the coil, thus keeping it unplated.

After the plating has been completed, the assembly is washed, dried and soaked in acetone and the paper strip 32 is removed. The turns of the coil are then cemented together into a solid sheet by the following procedure: A thickened Bakelite lacquer is brushed onto the coil between the upper and lower rods 24 and 26. The lacquer may be pre-thickened by leaving several days in an unstoppered bottle, or unthickened lacquer may be brushed on in a current of warm air. Added strength may be given to the coil by inserting a few lengths of glass threads perpendicularly to the wires before the lacquer has hardened. The thus treated coil is dried in air and is then baked in an oven of 275° F. for seven minutes, which results in partially setting the lacquer but still leaves it flexible. The rods 24 and 26 are then rotated until the unlacquered portions are free. The metal foil 30 is removed and the unlacquered areas are lacquered and baked as above. The coil 1a is then demounted by loosening the set screws 23, pulling the end pieces 19 outwardly, and removing the rods 24 and 26 from the coil. The coil in this form is somewhat elliptical in shape, as shown in Fig. 3. It is then placed on a metal form having the desired trapezoidal cross-section and is pressed to the desired trapezoidal shape indicated as 1 in Figs. 1 and 4.

The coil is then baked at least twenty minutes at 275° F., which causes the lacquer to set completely and harden, thus providing a rigid film or membrane which preserves the shape of the coil. The surface of the coil is then preferably blackened, as by painting with a suspension of lampblack in turpentine.

Referring now to Fig. 4 of the drawings, a rectangular housing 40 is provided, having a partition 41 extending part way up from the bottom, as shown, and an opening 42 centrally disposed over the partition 41. Two coils 1 are suspended in the housing, one on each side of the partition, by one or more thin strands 43 of human hair or other material of low electrical and heat conductivity. Each strand 43 is cemented to a coil 1 at a point removed from the unplated strip 10, and is secured to the roof of the housing by any suitable means (not shown) as by cementing or suspending from a hook.

The coils 1 are connected in series with each other and, through the leads 44, 45, with a potentiometer 46 to measure the current generated by radiation falling on the hot junctions 11 through the opening 42.

It will be seen that a thermopile radiometer has been provided which is in the form of a self-sustaining coil requiring no supporting core. Further, the thermopile is of the compensated type, i. e., it is thermally unconnected with the housing. The instrument can be made by semi-skilled labor and without undue expense, and it can be housed within a very small tubular housing, for example, 7/8 inch diameter. It is highly sensitive and, since it operates in air, it obviates the selective filtering difficulties encountered in vacuum type thermopiles.

It will be apparent that variations can be made in the design and method of making the apparatus of the invention. Thus, the coil 1 may have other than a trapezoidal shape, and the support used to form the coil may be of any collapsible type, or it may be made of a metal such as magnesium and subsequently dissolved by sulfuric acid. Also, lacquers of thermosetting resins other than Bakelite may be used to stiffen and support the coil. The employment of two coils symmetrically disposed, as shown in Fig. 4, with respect to the source of radiation measured, is advantageous in that a more balanced, symmetrical effect is obtained, but obviously a single coil or more than two may be used. Also, the housing 40 is advantageously silvered on the exterior and blackened on the interior, by means well known in the art, to provide a reflective exterior surface and a heat absorbent interior surface.

Having thus described our invention, what we claim and desire to secure by Letters Patent is:

1. A self-sustaining thermopile radiometer coil having a continuous unbroken surface comprising a plurality of turns of electrically conducting wire of relatively fine gauge, each turn being embedded in and spaced from adjacent turns by a thin, continuous layer of hardened, thermosetting resin, said resin and wire constituting the only means for making said coil self-sustaining.

2. A thermopile comprising a coil of electrically conducting wire provided with a band of hot and cold junctions and made self-sustaining solely by a continuous layer of hardened thermosetting resin embedding the several turns of the coil, said coil forming a continuous unbroken surface.

3. The thermopile of claim 2, wherein said coil is of polygonal transverse cross-section and said band of hot and cold junctions straddles one edge of the coil so as to dispose the hot junctions on the opposite side of said edge with respect to the cold junctions and wherein the gauge of said conducting wire is relatively fine.

4. The thermopile of claim 3, wherein said coil is in the form of an isosceles trapezoid and the band of hot and cold junctions straddles an edge of the wider base of the trapezoid.

5. A thermopile of the compensated type, comprising a housing provided with an opening, a self-sustaining coil of electrically conducting wire embedded in and made self-sustaining solely by a hardened film of thermosetting resin and provided with a band of hot and cold junctions formed on the several turns of the coil, the said coil being suspended within and spaced from the walls of said housing by one or more strands of material having low electrical and thermal conductivity and being so positioned as to expose the hot junctions to and shield the cold junctions from radiation entering through said opening, said conducting wire being of relatively fine gauge.

6. A thermopile of the compensated type, comprising a housing provided with an opening, and a self-sustaining coil of relatively fine gauge wire suspended within and spaced from the walls of said housing by one or more strands of material of low electrical and thermal conductivity, said coil being embedded in and made self-sustaining solely by a continuous film of hardened thermosetting resin, being of trapezoidal cross-section, having its wide base exposed to said opening and being provided with a band of hot and cold junctions straddling one edge of said exposed base so as to expose the hot junctions to said opening and shield the cold junctions therefrom.

JOSEPH T. GIER.
LLEWELLYN M. K. BOELTER.
ROBERT BROMBERG.
EVERETT R. DEMPSTER.

(References on following page)

REFERENCES CITED

The following references are of record in the file of this patent:

UNITED STATES PATENTS

| Number | Name | Date |
|---|---|---|
| Re. 19,564 | Quereau | May 7, 1935 |
| 1,010,444 | Mitchell | Dec. 5, 1911 |
| 1,643,734 | Zworykin | Sept. 27, 1927 |
| 1,706,419 | Thorpe | Mar. 26, 1929 |
| 2,256,160 | Britton | Sept. 16, 1941 |
| 2,278,744 | Sparrow et al. | Apr. 7, 1942 |
| 2,287,460 | Wagenhals et al. | June 23, 1942 |
| 2,310,026 | Higley | Feb. 2, 1943 |
| 2,377,516 | Ray | June 5, 1945 |
| 2,378,804 | Sparrow et al. | June 19, 1945 |
| 2,408,093 | Patterson | Sept. 24, 1946 |

OTHER REFERENCES

Jones: J. Sc. Insts., vol. 14 (1937), page 85.